March 3, 1936.  W. B. FOGH  2,032,568
VEHICLE
Original Filed April 19, 1932  4 Sheets-Sheet 1
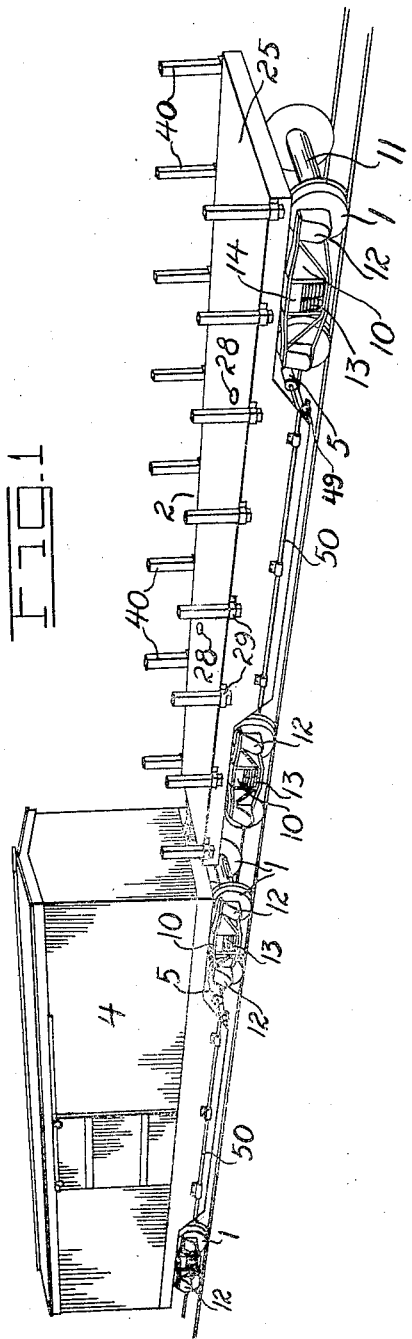
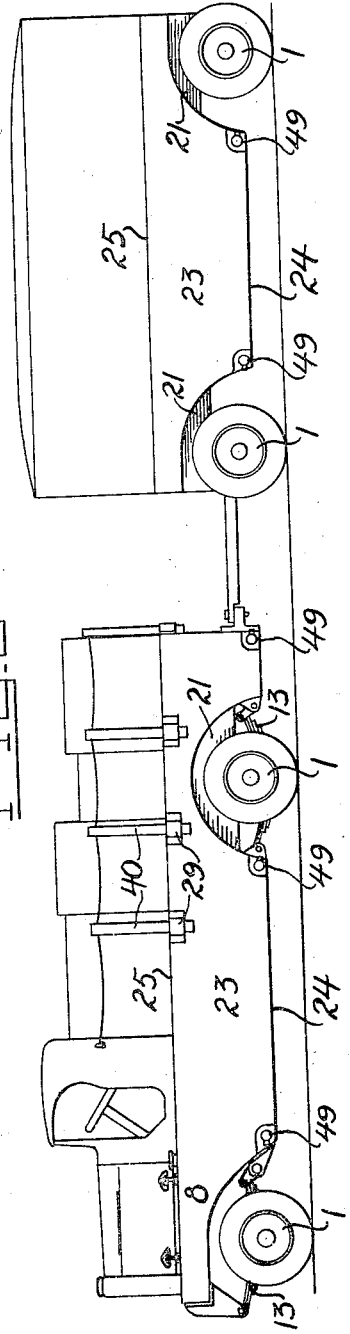
INVENTOR
Walter B. Fogh
BY
Charles L. Reynolds
ATTORNEY

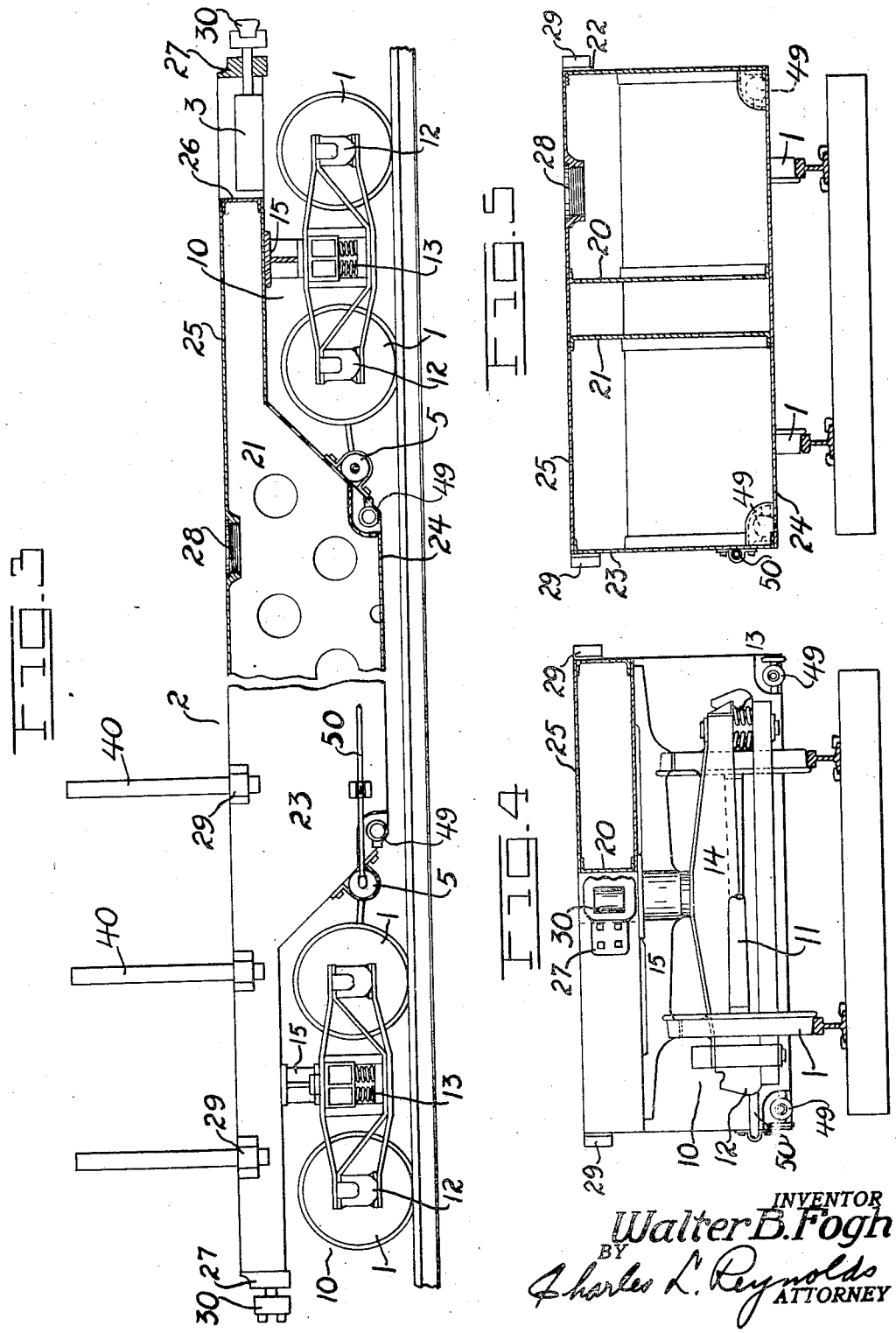

March 3, 1936. W. B. FOGH 2,032,568
VEHICLE
Original Filed April 19, 1932  4 Sheets-Sheet 3
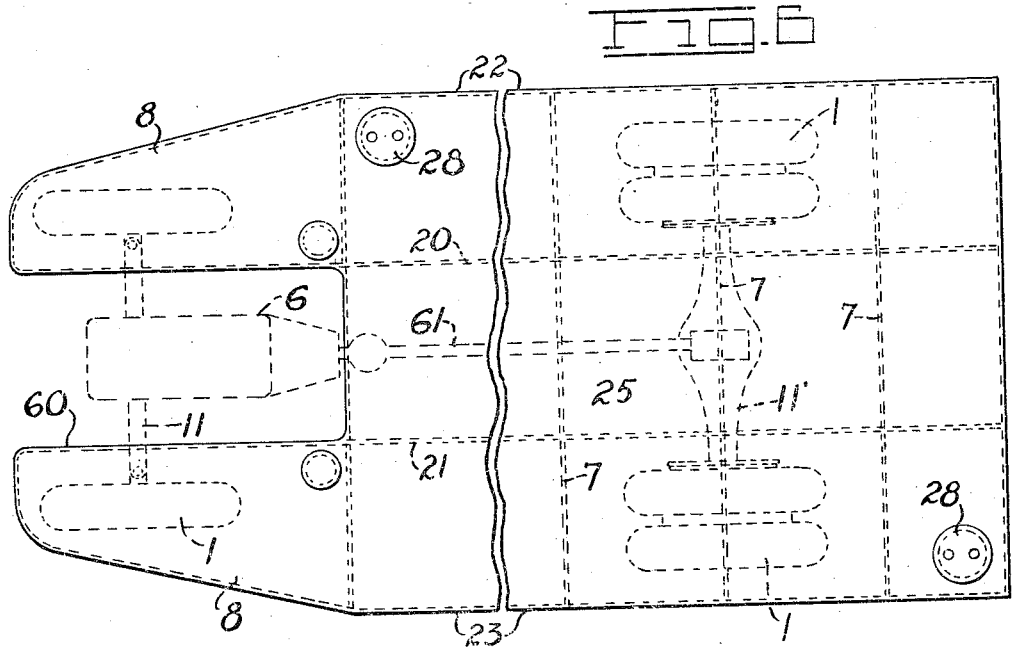
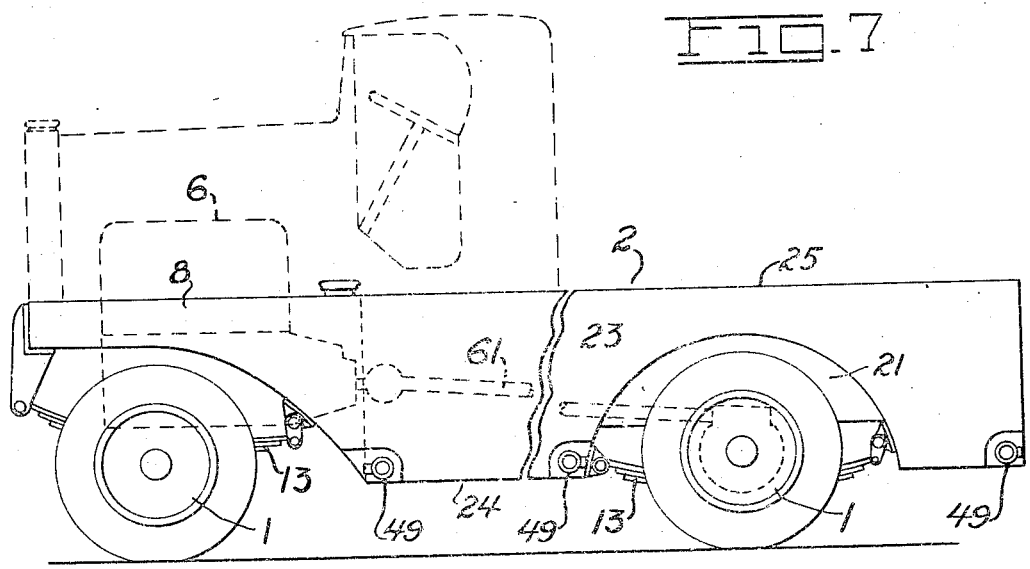
INVENTOR
Walter B. Fogh
BY
Charles L. Reynolds
ATTORNEY

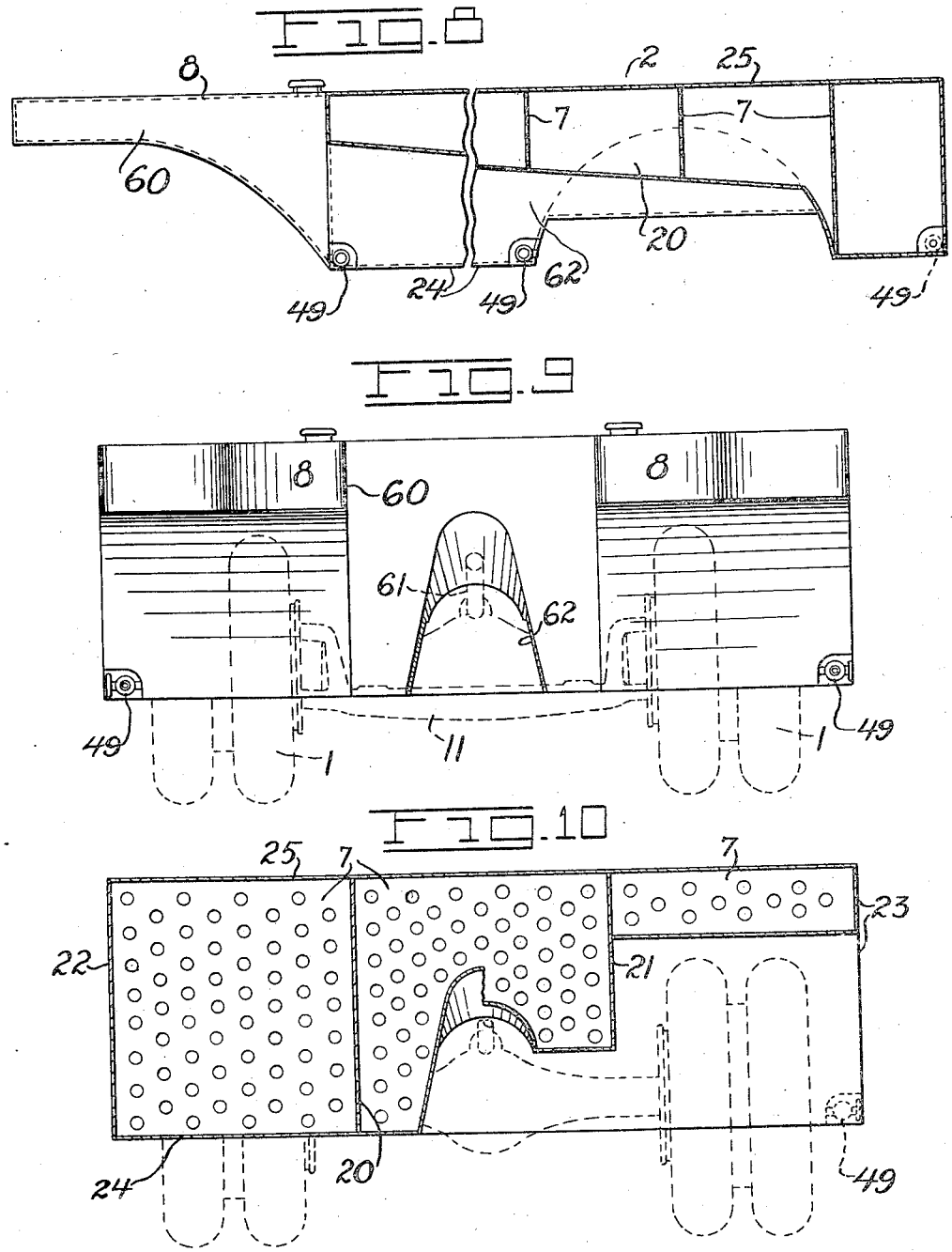

Patented Mar. 3, 1936

2,032,568

UNITED STATES PATENT OFFICE 2,032,568

VEHICLE

Walter B. Fogh, Seattle, Wash.

Application April 19, 1932, Serial No. 606,154
Renewed December 18, 1933

9 Claims. (Cl. 180—54)

My invention relates to vehicles for traveling upon the ground, more particularly vehicles intended to transport loads, and may be incorporated in such vehicles as railway cars, trucks, and trailers, for example.

Not infrequently it is necessary to transport liquids—oil and gasoline, as an example—from a point of origin to distant points, and the tank cars, trucks or trailers employed in this service then have to be returned, sometimes over considerable distances, without a load, because on account of the present construction of such tank vehicles, with a tank resting upon a chassis which in turn rests upon running gear, it is not possible to employ the vehicle for loads other than liquids, and it is not desirable to put other liquids than those for which it is intended into the tank, even should a return load of liquid be available. Nevertheless, at such points of delivery of the oil or gasoline, loads of produce or other goods originate for shipment to or near the point of origin of the oil or gasoline, and cars, trucks or trailers loaded with these goods go in the opposite direction, but upon returning cannot be filled with the liquids, because they are not well adapted to receiving liquid in large quantities so that it can be economically handled. In consequence, these cargo vehicles return to the point of origin without a load, or without a full load.

It is the primary object of my invention to devise a vehicle having incorporated in it a tank of capacity comparable with those now used for the hauling of oil, gasoline and other liquids, yet also adapted to the hauling of cargo, so that such a vehicle may be loaded with oil or gasoline at one point, possibly also loaded with cargo resting upon the tank, taken over a railroad or highway to a point of delivery, and there or nearby pick up a load of cargo, such as garden truck, grain, or even heavy machinery, and carry the same back to the point of origin of the oil, thus eliminating return trips without a load.

It is a further object to devise a vehicle intended for the transportation of liquids in quantities, in which the liquid is carried with its center of gravity low with relation to the running gear of the vehicle, thus eliminating stresses found in the present construction, cheapening construction, and lessening the strain upon roads, rails, and roadbeds.

It is a further object to simplify and cheapen the construction of vehicles adapted to such service as is indicated above by incorporating the chassis as part of the liquid tank, or conversely stated, eliminating the chassis and substituting therefor a tank which is designed not only to support itself and contents, but to support a load upon its upper surface as well as to support any motor which may be required for propelling the vehicle.

My invention comprises the novel parts, and the novel combination and arrangements thereof with relation to each other and to standard parts, all as shown in the accompanying drawings, described in this specification, and as will be more particularly defined by the claims which terminate the same.

In the accompanying drawings I have illustrated my invention incorporated in various types of vehicles, and in forms such as are now preferred by me.

Figure 1 is a perspective view of a railway car embodying my invention, two such cars being shown, one as a box car and the other as a flat car.

Figure 2 is a side elevation of a motor truck and trailer each embodying my invention.

Figure 3 is a part side elevation and part longitudinal vertical section through a railway car incorporating my invention, and Figure 4 is a part end elevation and part transverse section through such a car near an end, and Figure 5 is a transverse section through the central portion of such a car.

Figure 6 is a plan view of a motor truck embodying my invention, and Figure 7 is a side elevation thereof.

Figure 8 is a longitudinal central section through such a motor truck, Figure 9 is a front elevation thereof, and Figure 10 is a transverse vertical section through the same.

In any such vehicle the essential elements are running gear, which would be spaced at front and rear of the vehicle, and a body which is formed as a tank to be mounted directly upon the running gear, and which functions as a chassis or load-supporting member. If the tank is carried at a level above the running gear—that is, above its points of support upon the running gear—it will extend considerably into the air, and to such an extent that its value as a cargo carrier may be considerably lessened, or, in the alternative, its capacity as a liquid carrier will be greatly reduced. This is the objection to the present vehicles. However, between the front and rear running gear the tank body may, and preferably does, depend to a level somewhere near the rails or the road, or whatever supports the wheels of the running gear. In a railway car this level may be close to the top of the rails, for the locomotive in any event has members which extend substantially to this level, and the railroad is laid out to accommodate such low-hung parts. In a road truck or trailer the axles of the vehicle in any event extend to a point lower than the normal point of support of the tank body upon the running gear, and intermediate its ends it may extend to such a level. Thus, the space between the front and rear wheels, ordinarily not available for cargo storage, is made available by reason of the elimination of the chassis as a separate element, and the dropping of the bottom of the tank body to a level approximately that of the vehicle's axles.

Figure 1 illustrates my invention incorporated in one instance in a flat car, and in the other instance in a box car. The car itself is the same in each instance, but in the one case has stakes applied to hold in place a load on the flat deck of the car, and in the other instance has a box car body applied to the top of the car itself. The two trucks 10 are or may be of standard construction, embodying the wheels 1, the axles 11, journal boxes 12, springs 13, and bunks 14. Pivotally mounted upon the bunks 14, as is customary, is the cross sill 15, and directly supported upon this cross sill and connecting the two cross sills at opposite ends of the car is the tank body. In effect the tank body is supported directly upon the running gear.

As seen in Figures 3, 4, and 5, this tank body, generally designated 2, comprises the longitudinal sills 20 and 21 adjacent the center but preferably spaced apart somewhat, the similar longitudinal sills 22 and 23 which form the outside walls of the tank, the bottom plate 24, and the top plate 25. The members 20, 21, 22 and 23 may be supplemented by additional longitudinal or transverse members, or by braces. Each of these members referred to is preferably formed by a girder, substantially upright, and with its ends resting upon the cross sill 15, but intermediate the trucks 10, extending downward to a level adjacent the rails. This makes the center portion extremely strong, and it may be apertured to reduce the weight and to afford communication between the several compartments into which these girders or longitudinal sills divide the tank. The bottom plate 24 follows the shape of the lower edge of the longitudinal members 20, 21, 22, and 23, and their top edges preferably lie in a common plane so that the top plate 25 may be flat and level to support a load. Filler openings, closed by plugs 28, give access to the interior of the tank, and drain valves 49 enable the drawing off of the liquid. The end of the tank may be closed by transverse plates or channel members 26. Preferably the end of the tank, between the central sills 20 and 21, is recessed somewhat to receive the anchor end of the drawbar coupling, as indicated at 3, whereby the coupling device 30 for attachment to a complemental member upon the next car is supported, and the anchor portion 3 may be secured directly to the members 20 and 21. An end bolster 27 may be provided if desired, and to afford access to the interior of the tank holes 28 may be provided. Sockets or straps 29 may be provided for the reception of stakes 40, if the car is intended for use as a flat car, or a box car body 4, as seen in Figure 1, may be applied directly upon the deck. Obviously, the deck may be covered with planks, if that is deemed desirable, provision being made to afford access to the filling openings.

The usual train pipes, illustrated at 50, are carried upon the outside of the tank body, and the brake cylinder 5, instead of being mounted beneath the body, may be mounted transversely at the ends of the depending portion of the tank body 2, and there may be one of these brake cylinders for each truck.

In order to embody the invention in a motor truck the same principles may be followed, the tank body 2 taking the place of the chassis. It may be recessed at the front edge as illustrated at 60 in Figure 6, for the reception of the truck motor 6. The motor 6 would ordinarily be mounted immediately above the front axle 11, and a drive shaft 61 usually extends from the motor rearwardly to the rear axle, designated 11' to distinguish it from the front axle 11, though any other means to transmit power from the motor to the rear wheels may be used. To accommodate this drive shaft 61 it will be necessary to recess the longitudinal central portion of the tank by providing an upwardly extending trough 62 (see Figures 8, 9, and 10) within which the drive shaft 61 lies and within which it may move up and down to give effect to the springs 13. The springs are secured to the tank body itself, which is suitably braced to support the load and to counteract the stresses applied to it, all as good engineering practice dictates.

In a road vehicle, subject to frequent and rather abrupt changes of speed, it is desirable to provide slosh plates to minimize surging of the liquid from one end of the tank to the other, and these are illustrated at 7 in Figure 8. These serve as transverse internal bracing members.

In order to simplify the construction to the utmost, and to strengthen the front end, the tank preferably extends over the front wheels, stiffening and reinforcing the central sills 20 and 21, and this extension also effects the function usually performed by the front fenders. Similarly, the rear portion extends over the rear wheels, and it is possible to provide an overhanging depending portion behind the rear wheels, as indicated in Figure 7. This overhanging portion may form the supply tank for the gasoline which propels the vehicle, but preferably the vehicle's fuel supply is carried in the compartments 8, above the front wheels, thus eliminating a long gasoline line.

The usual hood, steering and control mechanism, and the like, may be mounted upon the tank body thus formed, as illustrated in Figure 2. The trailer body may more conveniently have the wheels mounted at the ends of the body, and this eliminates any overhanging portion.

What I claim as my invention is:

1. A motor vehicle comprising rear drive wheels and front wheels, front and rear axles joining the corresponding wheels, a motor disposed above the front axle, a drive shaft extending from the motor rearwardly to the drive wheels, and a tank supporting said motor and supported from said axles, and therebetween depending substantially to the level of the axles.

2. A motor vehicle comprising rear drive wheels and front wheels, front and rear axles joining the corresponding wheels, a motor disposed above the front axle, a drive shaft extending from the motor rearwardly to the drive wheels, and a tank supporting said motor and supported from said axles, and therebetween depending substantially to the level of the axles, the central longitudinal portion of the tank having an upwardly extending trough to receive the drive shaft.

3. A motor vehicle comprising rear drive wheels and front wheels, and axles joining them, a motor disposed above the front axle between the wheels, a drive connection from the motor to the rear wheels, and a tank recessed at its front end to support said motor, and supported upon and extending over the front and rear wheels.

4. A motor vehicle comprising a flat-top tank, a motor supported thereon, front and rear road wheels supporting the tank, and the tank depending between said wheels to a level adjacent the roadway, and a drive connection from said motor to certain of said road wheels.

5. A motor vehicle comprising a tank bifurcated at its forward end, a motor received in said bifurcation, road wheels supporting the tank, and a drive connection from said motor to certain of said road wheels.

6. A motor vehicle comprising two or more pairs of wheels, one pair at the front and the other pair at the rear of the vehicle, one pair constituting driving wheels, a motor, a drive connection between the motor and the driving wheels, and a single tank supporting the motor, and supported by the wheels, said tank occupying substantially the entire space between the four wheels from a level above the ground and between the wheels at opposite sides upward to a point at least level with the tops of the wheels.

7. A motor vehicle comprising two or more pairs of wheels, one pair at the front and one pair at the rear of the vehicle, a motor disposed at one end of the vehicle, the wheels at the opposite end constituting driving wheels, a drive shaft extending from the motor to the driving wheels, and a single tank occupying substantially the entire space between front and rear wheels from a level above the drive shaft and between the wheels of the respective pairs upward to a point at least level with the tops of the wheels, and transversely between the wheels at opposite sides, and said motor being supported upon said tank, and the wheels supporting the tank.

8. A road vehicle comprising front and rear axles, front and rear sets of wheels mounted on the respective axles, a cargo deck disposed above the level of the wheels, and extending from side to side a width substantially equal to the distance between the outer sides of opposite wheels, and lengthwise from a point in advance of the front axle to a point in rear of the rear axle, but furcated at its forward end to receive a motor, a motor mounted in such furcation, a drive connection between said motor and one set of wheels, a tank of which said cargo deck constitutes the top, and substantially coextensive therewith, said tank resting upon and forming the draft connection between the two axles, and being recessed to accommodate the wheels.

9. A motor vehicle comprisng a front and a rear set of wheels, and axles joining the wheels of the respective sets, a tank supported upon said axles and recessed at one end, a motor supported in said recess, and a drive connection from said motor to one of said sets of wheels.

WALTER B. FOGH.